US010338258B2

(12) United States Patent
Chalenski

(10) Patent No.: US 10,338,258 B2
(45) Date of Patent: Jul. 2, 2019

(54) MARINE SEISMIC SURVEYING

(71) Applicant: SHELL OIL COMPANY, Houston, TX (US)

(72) Inventor: David Arthur Chalenski, Houston, TX (US)

(73) Assignee: SHELL OIL COMPANY, Houston, TX (US)

(*) Notice: Subject to any disclaimer, the term of this patent is extended or adjusted under 35 U.S.C. 154(b) by 0 days.

(21) Appl. No.: 15/580,592

(22) PCT Filed: Jun. 10, 2016

(86) PCT No.: PCT/US2016/036848
§ 371 (c)(1),
(2) Date: Dec. 7, 2017

(87) PCT Pub. No.: WO2016/201197
PCT Pub. Date: Dec. 15, 2016

(65) Prior Publication Data
US 2018/0164456 A1 Jun. 14, 2018

Related U.S. Application Data

(60) Provisional application No. 62/174,597, filed on Jun. 12, 2015.

(30) Foreign Application Priority Data

Jun. 16, 2015 (EP) ..................................... 15172246

(51) Int. Cl.
G01V 1/38 (2006.01)

(52) U.S. Cl.
CPC .......... *G01V 1/3808* (2013.01); *G01V 1/3817* (2013.01); *G01V 1/3835* (2013.01); *G01V 1/3861* (2013.01)

(58) Field of Classification Search
CPC .. G01V 1/3808; G01V 1/3861; G01V 1/3835; G01V 1/3817
(Continued)

(56) References Cited

U.S. PATENT DOCUMENTS 5,682,357 A * 10/1997 Rigsby ................ G01V 1/3808
181/110
6,285,956 B1 9/2001 Bennett et al.
(Continued)

FOREIGN PATENT DOCUMENTS

WO 2009005939 A1 1/2009
WO 2015071491 A1 5/2015

OTHER PUBLICATIONS

Mateeva et al., "Distributed acoustic sensing for reservoir monitoring with vertical seismic profiling", Geophysical Prospecting, 2014, vol. 62, pp. 679-692.
(Continued)

*Primary Examiner* — Daniel L Murphy

(57) ABSTRACT

A system for acquiring a marine seismic survey makes use of a propelled vessel (40) towing at least a seismic source assembly (100) behind it. The navigation control system (42) of the propelled vessel is instructed to steer the propelled vessel in response to position information repetitively generated by a source global positioning system (GPS, 130) which forms part of the seismic source assembly being towed. The position information from the source GPS is thus used to navigate the seismic source assembly to a target location. The position information from the source GPS is also used to trigger activation of the seismic source when the seismic source is located within a pre-determined distance from the target location.

35 Claims, 1 Drawing Sheet

(58) Field of Classification Search
USPC .......................................................... 367/16
See application file for complete search history.

(56) References Cited

U.S. PATENT DOCUMENTS

| | | |
|---|---|---|
| 2004/0228214 A1 | 11/2004 | Tulett |
| 2006/0209634 A1 | 9/2006 | Vigen |
| 2010/0034053 A1 | 2/2010 | Fleure et al. |
| 2010/0149911 A1 | 6/2010 | Hopperstad et al. |
| 2011/0122724 A1 | 5/2011 | Hopperstad |
| 2012/0069702 A1 | 3/2012 | Muyzert et al. |
| 2013/0155805 A1 | 6/2013 | Tonchia |
| 2013/0258807 A1 | 10/2013 | Erneland |
| 2015/0085609 A1 | 3/2015 | Hillesund et al. |

OTHER PUBLICATIONS

International Search Report and Written Opinion received for PCT Patent Application No. PCT/US2016/036848, dated Aug. 26, 2016, 11 pages.

* cited by examiner

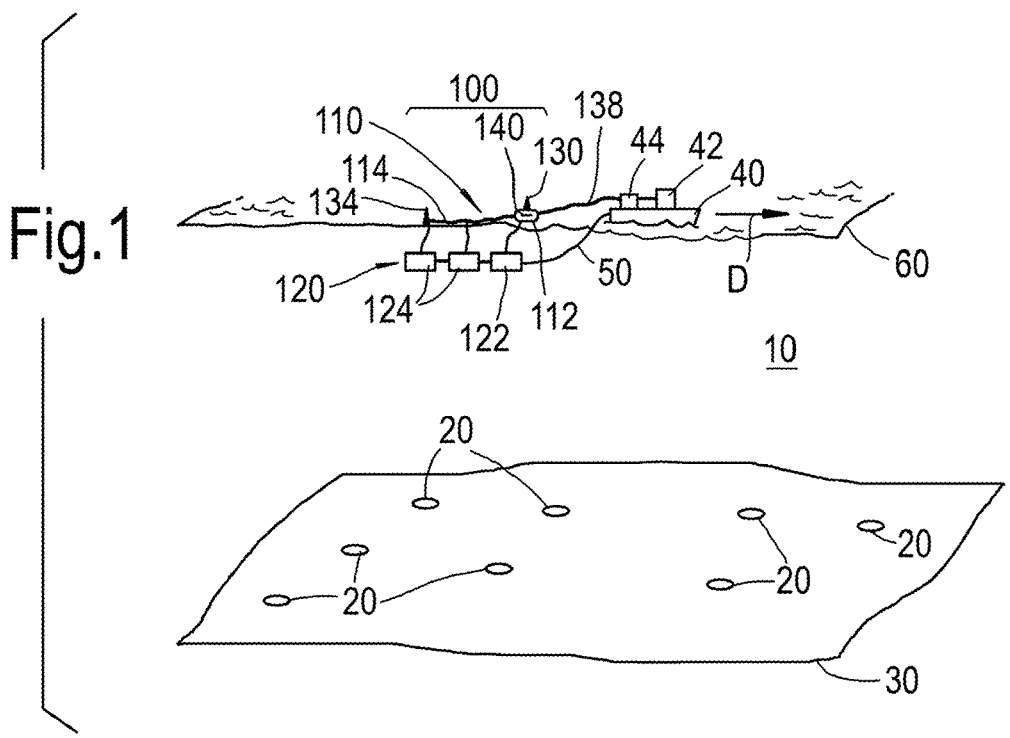
Fig.1
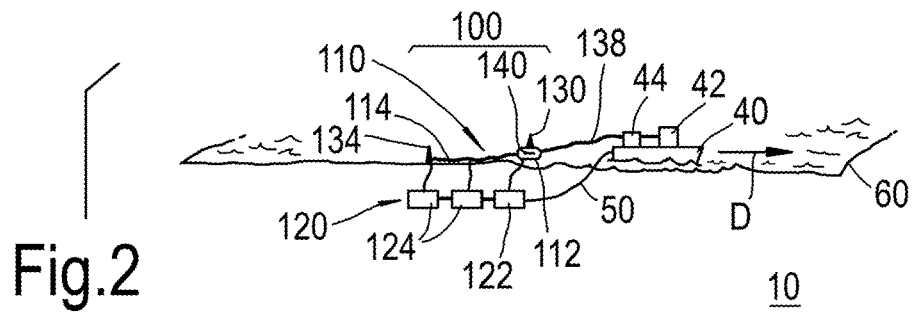
Fig.2
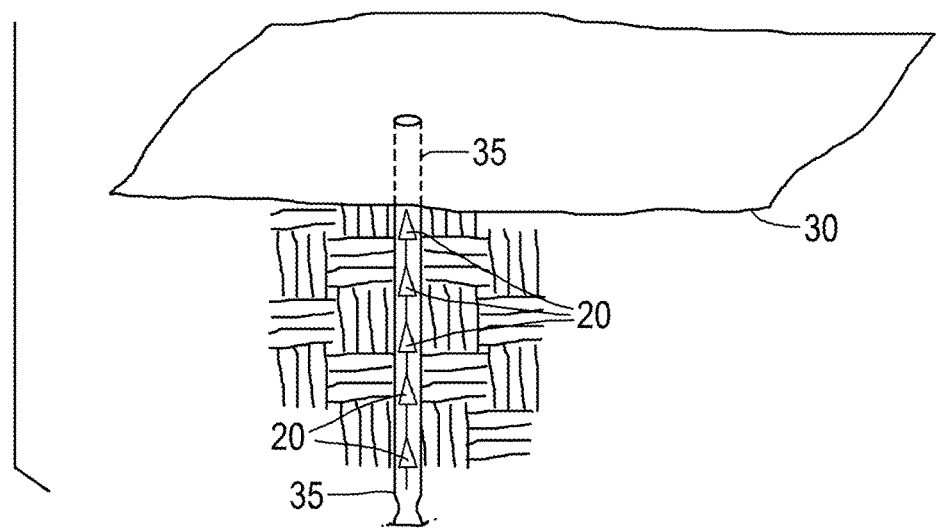

MARINE SEISMIC SURVEYING

CROSS REFERENCE TO RELATED APPLICATIONS

This is a National Stage application of PCT/US2016/036848, filed 10 Jun. 2016, which claims benefit of U.S. provisional application 62/174,597, filed 12 Jun. 2015, and of European application EP 15172246.9 filed 16 Jun. 2015.

FIELD OF THE INVENTION

The present invention relates to a marine seismic surveying system and a method of creating a marine seismic survey.

BACKGROUND OF THE INVENTION

A seismic survey typically involves deploying seismic source(s) and seismic sensors in a survey area. The seismic sources generate seismic waves, which propagate into geological formations crating pressure changes and vibrations in the formations along their way. Changes in elastic properties of the geological formation scatter the seismic waves, thereby changing their direction of propagation and possibly other properties. A part of the scattered waves reaches the seismic sensors, where seismic signals caused by the interaction of these waves with the seismic sensors are detected and possibly recorded.

Marine seismic surveys may be carried out in a variety of manners. For example, a number of sources and seismic sensors may be towed by a propelled vessel. The seismic sensors may be arranged in one or more streamers to create a line or a 2D grid of seismic sensors. Alternatively, the seismic sensors are deployed on the sea floor, for instance in the form of seismic nodes sometimes referred to as ocean bottom nodes.

US pre-grant publication 2012/0069702 describes a marine seismic survey system using an autonomously or remotely operated vehicle. Such a system may include a water vehicle. The water vehicle may be deployed to a desired position for seismic surveying. Upon positioning, a seismic source that is towed behind the water vehicle may be detonated to generate acoustic waves that propagate through the ocean bottom surface and into the strata beneath the ocean bottom surface. The water vehicle may be equipped with an onboard GPS device.

Time-lapse surveys generally require that a survey is repeated after a certain amount of time has evolved. Time-lapse signals reflect differentials between two or more surveys that result from changes in the survey results over time. The sensitivity of a time-lapse survey to changes in the geological formations depends on the repeatability of the acquisition. The smaller the variation in acquisition conditions is, the more sensitive the time-lapse survey becomes to small changes within the geological formations that are being investigated.

SUMMARY OF THE INVENTION

In accordance with a first aspect of the present invention, there is provided a marine seismic surveying system comprising:
 a plurality of seismic receivers;
 a propelled vessel comprising a navigation control system arranged to steer the propelled vessel;
 a seismic source assembly attached to the propelled vessel with a towing line, the seismic source assembly comprising:
  a float;
  a seismic source suspended from the float; and
  a source global positioning system installed on the float;
 a computer system, in communication with the navigation control system of the propelled vessel and with the global positioning system of the seismic source assembly, and arranged to instruct the navigation control system to steer the propelled vessel in response to position information repetitively generated by the source global positioning system to navigate the seismic source assembly to a target location, and to trigger activation of the seismic source when the seismic source is located within a pre-determined distance from the target location.

In accordance with another aspect of the invention, there is provided a method of creating a marine seismic survey, comprising:
 navigating a propelled vessel through a body of water whereby steering the propelled vessel using a navigation control system;
 towing a seismic source assembly behind the propelled vessel, said seismic source assembly comprising:
  a float;
  a seismic source suspended from the float; and
  a source global positioning system installed on the float;
 repetitively generating position information of the seismic source assembly with the source global positioning system;
 feeding the position information generated by the source global positioning system to a computer system; and
 issuing instructions from the computer system to the navigation control system to steer the propelled vessel in response to position information generated by the source global positioning system, thereby navigating the seismic source assembly to a target location; and
 triggering activation of the seismic source when the seismic source according to the position information generated by the source global positioning system is located within a pre-determined distance from the target location;
 recording signals using a plurality of seismic receivers.

BRIEF DESCRIPTION OF THE DRAWING

FIG. 1 is a schematic perspective view of an example marine seismic surveying system; and FIG. 2 is a schematic perspective view of another example marine seismic surveying system.

The figures are not to scale. Identical reference numbers used in different figures refer to mutually similar components.

DETAILED DESCRIPTION OF THE INVENTION

The invention will be further illustrated hereinafter by way of example only, and with reference to the non-limiting drawing.

The present disclosure proposes an improved method and system for acquiring a marine seismic survey, which makes use of a propelled vessel towing at least a seismic source assembly behind it.

In normal practice the towing vessel steers to station and the seismic source assembly just follows behind. This can lead to positioning errors because of the currents that may steer the seismic source assembly from being immediately behind the vessel at a constant relative position. It is presently proposed to instruct the navigation control system of the propelled vessel to steer the propelled vessel in response to position information repetitively generated by a source global positioning system (GPS), which forms part of the seismic source assembly being towed. The position information from the source GPS is thus used to navigate the seismic source assembly to a target location. The position information from the source GPS is also used to trigger activation of the seismic source when the seismic source is located within a pre-determined distance from the target location.

Specifically, the position information repetitively generated by the source global positioning system is the only position information used by the navigation control system to steer the propelled vessel. In such embodiments, the instructions issued from the computer system to the navigation control system to steer the propelled vessel are generated relying on no other position information than the position information generated by the source global positioning system.

An advantage of this proposal is that the position information that is used to position and trigger the seismic source is more directly linked to the actual position of the seismic source than if the position information of the vessel GPS would be used. Herewith the repeatability of the location from which the seismic source is activated in a time-lapse survey can be improved. No active source steering device other than the propelled vessel is needed to keep the seismic source on a pre-plot path, since the propelled vessel is steered directly by a continuous feedback loop using the source global positioning system which already generates actual position information. Thus in preferred embodiments the seismic source assembly does not include, and is not connected to, any active source steering device other than the propelled vessel.

The ability to trigger the seismic source within the pre-determined distance from the target location is expected to reduce subsequent data processing because the data needs less processing to account for differences in source locations in a time-lapse survey. Furthermore the accuracy and sensitivity of the time-lapse signals is expected to benefit from the ability to trigger the seismic source within the pre-determined distance from the target location.

The current proposition of steering the propelled vessel in response to feedback from the source GPS seems particularly useful for relatively small, suitably autonomous, vessels compared to standard manned seismic survey vessels. The proposition is also expected to be beneficial when the shooting pattern is not uniform, wherein previous source locations are visited in a non-consecutive manner. This may for instance facilitate matching to tide and/or wave heights.

The source GPS is typically mounted on the towed seismic source assembly. For the purpose of interpreting this disclosure, the term "mounted on" includes mounted in the seismic source assembly. It is remarked that it is a known feature to have a GPS system on a towed floating seismic source assembly, as evidenced by for instance US pre-grant publication 2011/0122724. However, to the inventor's best knowledge it has never been proposed to feed the position information back to the navigation control system as the only position in formation used to modify steering instructions for the propelled vessel.

FIG. 1 schematically shows a perspective view of an example marine seismic surveying system deployed in/on a body of water 10. A plurality of seismic receivers 20 is deployed on a sea floor surface 30 or buried underneath the sea floor surface 30. The seismic receivers 20 are shown distributed in a 2D area. However, this is not limiting on the invention. A distribution in a 1D line is also an option. Alternatively, the plurality of receivers 20 may be towed by a propelled vessel instead of being deployed on the sea floor surface 30.

A propelled vessel 40 navigates on a water surface 60 of the body of water 10. The propelled vessel 40 includes a navigation control system 42, which is arranged to steer the propelled vessel 40 in any direction D. A computer system 44 is in communication with the navigation control system 42. Suitably, the computer system 44 may be arranged on the propelled vessel 40.

The propelled vessel 40 is configured to tow a seismic source assembly 100. The seismic source assembly 100 is attached to the propelled vessel 40 with a towing line 50. The seismic source assembly includes a float 110, capable of floating on the water surface 60 and keeping at least one seismic source suspended from the float 110 into the body of water 10. The seismic source assembly 100 is not propelled by itself.

There are various suitable designs for such a float 110. One known type comprises a head buoy 112 and a tail section 114, both floatable. A seismic source 122 is suspended from the float 110. FIG. 1 shows an entire source array 120, which in addition to the seismic source 122, comprises one or more other seismic sources 124 suspended from the tail section 114. A source global positioning system (GPS) 130 is installed on the float 110. Suitably, the source GPS 130 is installed on and/or within the head buoy 112. Optionally, additionally or instead thereof, a trailing source GPS 134 may be installed in the tail section 114.

Examples of a float including an array of acoustic sources are disclosed in US pre-grant publications 2010/0149911 and 2011/0122724. These examples also include hydrophones that pair up with the acoustic sources by which the near field signatures of each of the acoustic sources can be monitored and recorded. However, such provisions are optional in the context of the present disclosure. For the present disclosure, the tail section 114 is optional as well. Only a single seismic source 122 or cluster of sources (in the referenced US pre-grant publications, a distinction is made between an array and a cluster of sources) suspended from the head buoy 112 may suffice.

The computer system 44 is also in communication with the source global positioning system 130 of the seismic source assembly 100. This may be via a wired link 138, or a wireless link, which may be preferred. The computer system 44 is arranged to instruct the navigation control system 42 of the propelled vessel 40 to steer the propelled vessel 40, in response to position information repetitively generated by the source GPS 130 to navigate the seismic source assembly 100 to a target location. To this end the computer system 44 may comprise a feedback program which instructs the navigation control system 42 to steer the propelled vessel 40 such as to reduce a differential between current position information and the target location. The target location corresponds to a desired seismic shot location, where it is desired to trigger activation of the seismic source 122. In effect, at least during the seismic surveying, a feedback loop is continuously operative wherein the source GPS 130 provides the only position information fed into the feedback loop and the navigation of the propelled vessel is the only means by which the position of the source assembly 100 and/or the source GPS 130 is actively manipulated (or modified).

The computer system 44 is also configured to trigger activation of the seismic source 122 when the seismic source is located within a pre-determined distance from the target location. The computer system 44 detects whether the seismic source 122 is within the pre-determined distance from the target location. When this is the case, a trigger signal to trigger activation of the seismic source 122 is issued. The trigger signal is issued to the control system of the seismic source assembly 100.

The navigation control system 42 may, in addition to the position information generated by the source GPS 130, also rely on main position information provided by a main GPS arranged on the propelled vessel 40. Suitably, navigation instructions based on the position information from the source GPS 130 is employed to fine-tune the main navigation instructions that are based on the main position information. The main advantage of the present disclosure is that the propelled vessel 40 is dynamically steered using feedback from the seismic source assembly 100, to facilitate activating the seismic source 122 within a pre-determined distance from coordinates of a target location.

The pre-determined distance from the target location may be set as close to the target location as feasible. The repeatability of the shot location would be favoured by a small pre-determined distance, but this would make it harder to navigate to. A good compromise can be found by selecting the pre-determined distance between 2 m and 10 m, preferably between 2 m and 5 m.

Suitably, the target location corresponds to an actual shooting location where activation of the seismic source 122 has been triggered during a previous survey, or to a previous target location used as target location for positioning the seismic source assembly in a previous survey, and in a vicinity of where the seismic source has been triggered during that previous survey. The present survey can then be used together with the previous survey to obtain a time-lapse seismic survey, such as a 4D survey, with improved shot-location repeatability.

The seismic source assembly may further be equipped with a towed accelerometer 140. The towed accelerometer 140 may be in communication with the computer system 44, to supplement the position information with acceleration information. Advantageously, the computer system is arranged to steer the propelled vessel in response to the position information as well as the acceleration information.

The propelled vessel in the marine seismic surveying system described herein is suitably an unmanned vessel. This may be an autonomous unmanned vessel (AUV) or a remotely operated unmanned vessel (ROV). An advantage of employing such an unmanned vessel, apart from less manpower that needs to be engaged, is that an unmanned vessel is generally more versatile and agile than a (larger) manned vessel for seismic surveying. Suitably, the light-ship displacement tonnage (LDT) of the unmanned vessel is less than 50 metric tonnes, preferably less than 10 metric tonnes. The unmanned vessel suitably has a length of less than 15 meters, preferably less than 9 m. For instance, Autonomous Surface Vehicles Ltd., United Kingdom, (ASV) markets an oil field services autonomous vehicle under the name C-Worker 6, which has a light-displacement of 3.5 metric tonnes and a length of 5.85 meters (incl. fender rim), is considered a suitable vessel for the marine seismic surveying as presently disclosed. Nonetheless, alternatives exist and/or can be developed. Light-ship displacement tonnage (LDT) is defined as water displacement of the vessel in condition complete and ready for service in every respect, including permanent ballast, spare parts, lubricating oil, and working stores but without fuel, cargo, drinking or washing water, officers, crew, passengers, their effects, or any other variable load.

For time-lapse seismic surveys there may be a preference to have the seismic receivers 20 deployed on or below the sea floor 30, rather than towed in streamers behind the seismic source assembly 100. In configurations wherein the seismic receivers 20 are deployed on or below the sea floor 30, the propelled vessel 40 and the seismic source assembly 100 can navigate freely with respect to the plurality of seismic receivers 20. The target location is in a fixed position relative to the plurality of seismic receivers 20. Moreover, such configurations also impose lighter requirements on the propelled vessel in terms of, for instance, propelling power. This is because the propelled vessel only needs to tow the seismic source assembly 100 and no streamers with seismic receivers.

Preferably, the seismic source assembly 100 comprises exclusively a single seismic source 122. This will make the overall size of the seismic source assembly 100 smaller which benefits the source repeatability. Moreover, a smaller seismic source assembly 100 is easier to tow than a standard large multiple-source assembly. A single seismic source can be one impulsive energy device or a cluster of multiple impulsive energy devices suspended at a single specific source location. The multiple impulsive energy devices within one cluster are so close together that they behave as a larger single impulsive energy device. For instance, multiple impulsive energy devices are within one cluster if they produce one common air bubble and thus effectively work together as a larger single impulsive energy device. Typically, the multiple impulsive energy devices within one cluster are in each other's proximity within one meter, i.e. not farther removed from one another by more than one meter. Impulsive energy devices in a cluster are operated as one single source. A source array comprises (clusters of) impulsive energy devices at multiple source locations.

Examples of impulsive energy sources include air gun and sparker source. The seismic source 122 is suitably an air gun (or a cluster of air guns). However, other types of seismic sources may also be used, including a sparker source.

The propelled vessel 40 may also be equipped with other sensing technology, such as oil slick samplers or other.

FIG. 2 schematically shows a perspective view of another example marine seismic surveying system, wherein the seismic receivers 20 are deployed below the sea floor surface 30. The seismic receivers 20 are suitably configured in a borehole 35, which may be vertical (shown) or deviated (not shown), or have vertical and deviated sections. Such deployments of seismic receivers 20 may be used for acquisition techniques such as vertical seismic profiling (VSP). Multiple target locations for activating the seismic source in may typically be distributed around the borehole 35 at multiple distances (measured horizontally) from the borehole 35 and/or multiple compass directions relative to the borehole 35. This way a two-dimensional area of illumination may be accomplished, with multiple off-sets.

The seismic receivers 20 may include arrays of discrete receivers, such as hydrophones and/or geophones. Alternatively, the seismic receivers 20 may be defined by receiver channels in a distributed sensor. An example of the latter is a distributed acoustic sensing (DAS) device employing a fiber optic cable. A description of DAS and how it works and can be applied to time-lapse monitoring has been published in an article by Albena Mateeva et al. in Geophysical Prospecting, Vol. 62, pp. 679-692 (2014) with the title "Distributed acoustic sensing for reservoir monitoring with vertical seismic profiling". The article is incorporated herein by reference.

The system and methodology described in the present patent application may be further refined by enhancing the shot location repeatability also in vertical sense. As the seismic source assembly floats on the body of water 10, it is susceptible to height variations due to tides and waves. In order to improve the height-repeatability of the seismic shot locations, it is recommended to repetitively generate height information of the float 110. The height information may be generated by the source GPS 130, or a dedicated height-sensor may be provided on the float 110. The height information is fed to the computer system 44. Based on this height information, which is expected to undulate as a result of waves, height predictions can be extrapolated into the future. An expected time of arrival of the seismic source 122 within said pre-determined distance from the target location may also be calculated, based on current distance of the source GPS 130 from the target location combined with current navigation speed. A target time of arrival of the seismic source 122 within said pre-determined distance from the target location based on a target height of the float 100 at the target location and said height predictions.

Based on this, a navigation speed correction may be calculated, by which the current navigation speed should be modified in order to arrive the seismic source 122 within said pre-determined distance from the target location when the float 100 is at the target height. A navigation speed instruction may thus be issued from the computer system 44 to the navigation control system 42, to implement the navigation speed correction thereby causing the seismic source 122 to arrive within said pre-determined distance from the target location when the float is at the target height.

Advantageously, the optional towed accelerometer 140 may be sensitive to vertically directed accelerations. The acceleration information may be taken into account in the calculations and extrapolations described in the above paragraphs to further improve the height repeatability.

The person skilled in the art will readily understand that, while the invention is illustrated making reference to one or more a specific combinations of features and measures, many of those features and measures are functionally independent from other features and measures such that they can be equally or similarly applied independently in other embodiments or combinations.

The person skilled in the art will understand that the present invention can be carried out in many various ways without departing from the scope of the appended claims.

The invention claimed is:

1. A marine seismic surveying system comprising:
   a plurality of seismic receivers;
   a propelled vessel comprising a navigation control system arranged to steer the propelled vessel;
   a seismic source assembly attached to the propelled vessel with a towing line, the seismic source assembly comprising:
   a float;
   a seismic source suspended from the float; and
   a source global positioning system installed on the float; and
   a computer system, in communication with the navigation control system of the propelled vessel and with the global positioning system of the seismic source assembly, and arranged to instruct the navigation control system to steer the propelled vessel in response to no other position information than position information repetitively generated by the source global positioning system to navigate the seismic source assembly to a target location, and to trigger activation of the seismic source when the seismic source is located within a pre-determined distance from the target location.

2. The marine seismic surveying system of claim 1, wherein the target location corresponds to a previous actual location where activation of the seismic source has been triggered during a previous survey.

3. The marine seismic surveying system of claim 1, wherein the target location corresponds to a previous target location in vicinity of where the seismic source has been triggered during a previous survey.

4. The marine seismic surveying system of claim 1, wherein the seismic source assembly further comprises a towed accelerometer in communication with the computer system, to supplement the position information with acceleration information, wherein the computer system is arranged to steer the propelled vessel in response to the position information as well as the acceleration information.

5. The marine seismic surveying system of claim 1, wherein the propelled vessel is unmanned and autonomous or unmanned and remote-controlled.

6. The marine seismic surveying system of claim 1, wherein the computer system is arranged on the propelled vessel.

7. The marine seismic surveying system of claim 1, wherein the plurality of seismic receivers is deployed on or below an ocean bottom floor, and wherein the propelled vessel and the seismic source assembly can navigate freely with respect to the plurality of seismic receivers.

8. The marine seismic surveying system of claim 7, wherein the target location is in a fixed position relative to the plurality of seismic receivers.

9. The marine seismic surveying system of claim 1, wherein the seismic source assembly comprises exclusively a single seismic source.

10. A method of creating a marine seismic survey, comprising:
    navigating a propelled vessel through a body of water whereby steering the propelled vessel using a navigation control system;
    towing a seismic source assembly behind the propelled vessel, said seismic source assembly comprising:
    a float;
    a seismic source suspended from the float; and
    a source global positioning system installed on the float;
    repetitively generating position information of the seismic source assembly with the source global positioning system;
    feeding the position information generated by the source global positioning system to a computer system;
    issuing instructions from the computer system to the navigation control system to steer the propelled vessel in response to no other position information than position information generated by the source global positioning system, thereby navigating the seismic source assembly to a target location;
    triggering activation of the seismic source when the seismic source according to the position information generated by the source global positioning system is located within a pre-determined distance from the target location; and
    recording signals using a plurality of seismic receivers.

11. The method of claim 10, wherein the target location corresponds to a previous actual location where activation of the seismic source has been triggered during a previous survey.

12. The method of claim 10, wherein the target location corresponds to a previous target location in vicinity of where the seismic source has been triggered during a previous survey.

13. The method of claim 10, further comprising generating acceleration information using a towed accelerometer configured on the seismic source assembly and feeding the acceleration information to the computer system, wherein the computer system issues the instructions to the navigation control system to steer the propelled vessel in response to the position information as well as the acceleration information.

14. The method of claim 10, wherein the plurality of seismic receivers is deployed on an ocean bottom floor and wherein the propelled vessel and the seismic source assembly are navigating freely with respect to the plurality of seismic receivers.

15. The method of claim 14, wherein the target location is in a fixed position relative to the plurality of seismic receivers.

16. The method of claim 10, further comprising:
repetitively generating height information of the float;
feeding the height information generated on the float to the computer system;
calculating an expected time of arrival of the seismic source within said pre-determined distance from the target location, based on current distance of the source global positioning system from the target location and current navigation speed;
calculating a target time of arrival of the seismic source within said pre-determined distance from the target location based on a target height of the float at the target location;
calculating a navigation speed correction by which the current navigation speed should be modified in order to arrive the seismic source within said pre-determined distance from the target location when the float is at the target height; and
issuing a navigation speed instruction from the computer system to the navigation control system to implement the navigation speed correction thereby causing the seismic source to arrive within said pre-determined distance from the target location when the float is at the target height.

17. A method of creating a marine seismic survey, comprising:
navigating a propelled vessel through a body of water whereby steering the propelled vessel using a navigation control system;
towing a seismic source assembly behind the propelled vessel, said seismic source assembly comprising:
a float;
a seismic source suspended from the float; and
a source global positioning system installed on the float;
repetitively generating position information of the seismic source assembly with the source global positioning system;
feeding the position information generated by the source global positioning system to a computer system;
issuing instructions from the computer system to the navigation control system to steer the propelled vessel in response to position information generated by the source global positioning system, thereby navigating the seismic source assembly to a target location;
triggering activation of the seismic source when the seismic source according to the position information generated by the source global positioning system is located within a pre-determined distance from the target location; and
recording signals using a plurality of seismic receivers, wherein the position information repetitively generated by the source global positioning system is the only position information used by the navigation control system to steer the propelled vessel.

18. A method of creating a marine seismic survey, comprising:
navigating a propelled vessel through a body of water whereby steering the propelled vessel using a navigation control system;
towing a seismic source assembly behind the propelled vessel, said seismic source assembly comprising:
a float;
a seismic source suspended from the float; and
a source global positioning system installed on the float;
repetitively generating position information of the seismic source assembly with the source global positioning system;
feeding the position information generated by the source global positioning system to a computer system;
issuing instructions from the computer system to the navigation control system to steer the propelled vessel in response to position information generated by the source global positioning system, thereby navigating the seismic source assembly to a target location;
triggering activation of the seismic source when the seismic source according to the position information generated by the source global positioning system is located within a pre-determined distance from the target location; and
recording signals using a plurality of seismic receivers, wherein the propelled vessel is steered directly by a continuous feedback loop using the source global positioning system which already generates actual position information.

19. The method of claim 18, wherein the instructions issued from the computer system to the navigation control system to steer the propelled vessel are generated relying on no other position information than the position information generated by the source global positioning system.

20. The method of claim 18, wherein the target location corresponds to at least one of a previous actual location where activation of the seismic source has been triggered during a previous survey and a previous target location in vicinity of where the seismic source has been triggered during a previous survey.

21. The method of claim 18, further comprising generating acceleration information using a towed accelerometer configured on the seismic source assembly and feeding the acceleration information to the computer system, wherein the computer system issues the instructions to the navigation control system to steer the propelled vessel in response to the position information as well as the acceleration information.

22. The method of claim 18, further comprising:
repetitively generating height information of the float;
feeding the height information generated on the float to the computer system;
calculating an expected time of arrival of the seismic source within said pre-determined distance from the target location, based on current distance of the source global positioning system from the target location and current navigation speed;

calculating a target time of arrival of the seismic source within said pre-determined distance from the target location based on a target height of the float at the target location;

calculating a navigation speed correction by which the current navigation speed should be modified in order to arrive the seismic source within said pre-determined distance from the target location when the float is at the target height; and issuing a navigation speed instruction from the computer system to the navigation control system to implement the navigation speed correction thereby causing the seismic source to arrive within said pre-determined distance from the target location when the float is at the target height.

23. A method of creating a marine seismic survey, comprising:

navigating a propelled vessel through a body of water whereby steering the propelled vessel using a navigation control system;

towing a seismic source assembly behind the propelled vessel, said seismic source assembly comprising:
a float;
a seismic source suspended from the float; and
a source global positioning system installed on the float;

repetitively generating position information of the seismic source assembly with the source global positioning system;

feeding the position information generated by the source global positioning system to a computer system;

issuing instructions from the computer system to the navigation control system to steer the propelled vessel in response to position information generated by the source global positioning system, thereby navigating the seismic source assembly to a target location;

triggering activation of the seismic source when the seismic source according to the position information generated by the source global positioning system is located within a pre-determined distance from the target location; and recording signals using a plurality of seismic receivers, wherein a feedback loop is continuously operative wherein the source global positioning system provides the only position information fed into the feedback loop and the navigation of the propelled vessel is the only means by which the position of the source assembly and/or the source global positioning system is actively manipulated.

24. The method of claim 23, wherein the target location corresponds to at least one of a previous actual location where activation of the seismic source has been triggered during a previous survey and a previous target location in vicinity of where the seismic source has been triggered during a previous survey.

25. The method of claim 24, further comprising generating acceleration information using a towed accelerometer configured on the seismic source assembly and feeding the acceleration information to the computer system, wherein the computer system issues the instructions to the navigation control system to steer the propelled vessel in response to the position information as well as the acceleration information.

26. The method of claim 24, further comprising:
repetitively generating height information of the float;
feeding the height information generated on the float to the computer system;
calculating an expected time of arrival of the seismic source within said pre-determined distance from the target location, based on current distance of the source global positioning system from the target location and current navigation speed;

calculating a target time of arrival of the seismic source within said pre-determined distance from the target location based on a target height of the float at the target location;

calculating a navigation speed correction by which the current navigation speed should be modified in order to arrive the seismic source within said pre-determined distance from the target location when the float is at the target height; and issuing a navigation speed instruction from the computer system to the navigation control system to implement the navigation speed correction thereby causing the seismic source to arrive within said pre-determined distance from the target location when the float is at the target height.

27. A marine seismic surveying system comprising:
a plurality of seismic receivers;
a propelled vessel comprising a navigation control system arranged to steer the propelled vessel;
a seismic source assembly attached to the propelled vessel with a towing line, the seismic source assembly comprising:
a float;
a seismic source suspended from the float; and
a source global positioning system installed on the float; and
a computer system, in communication with the navigation control system of the propelled vessel and with the global positioning system of the seismic source assembly, and arranged to instruct the navigation control system to steer the propelled vessel in response to position information repetitively generated by the source global positioning system to navigate the seismic source assembly to a target location, and to trigger activation of the seismic source when the seismic source is located within a pre-determined distance from the target location, wherein the propelled vessel is steered directly by a continuous feedback loop using the source global positioning system which already generates actual position information.

28. The marine seismic surveying system of claim 27, wherein the target location corresponds to at least one of a previous actual location where activation of the seismic source has been triggered during a previous survey and a previous target location in vicinity of where the seismic source has been triggered during a previous survey.

29. The marine seismic surveying system of claim 27, wherein the seismic source assembly further comprises a towed accelerometer in communication with the computer system, to supplement the position information with acceleration information, wherein the computer system is arranged to steer the propelled vessel in response to the position information as well as the acceleration information.

30. The marine seismic surveying system of claim 27, wherein the propelled vessel is unmanned and autonomous or unmanned and remote-controlled.

31. The marine seismic surveying system of claim 27, wherein the computer system is arranged on the propelled vessel.

32. A marine seismic surveying system comprising:
a plurality of seismic receivers;
a propelled vessel comprising a navigation control system arranged to steer the propelled vessel;

a seismic source assembly attached to the propelled vessel with a towing line, the seismic source assembly comprising:
  a float;
  a seismic source suspended from the float; and
  a source global positioning system installed on the float; and
a computer system, in communication with the navigation control system of the propelled vessel and with the global positioning system of the seismic source assembly, and arranged to instruct the navigation control system to steer the propelled vessel in response to position information repetitively generated by the source global positioning system to navigate the seismic source assembly to a target location, and to trigger activation of the seismic source when the seismic source is located within a pre-determined distance from the target location, further comprising a feedback loop continuously operative wherein the source global positioning system provides the only position information fed into the feedback loop and the navigation of the propelled vessel is the only means by which the position of the source assembly and/or the source global positioning system is actively manipulated.

33. The marine seismic surveying system of claim 32, wherein the target location corresponds to at least one of a previous actual location where activation of the seismic source has been triggered during a previous survey and a previous target location in vicinity of where the seismic source has been triggered during a previous survey.

34. The marine seismic surveying system of claim 32, wherein the seismic source assembly further comprises a towed accelerometer in communication with the computer system, to supplement the position information with acceleration information, wherein the computer system is arranged to steer the propelled vessel in response to the position information as well as the acceleration information.

35. The marine seismic surveying system of claim 32, wherein the propelled vessel is unmanned and autonomous or unmanned and remote-controlled.

\* \* \* \* \*